United States Patent [19]

DeWitt

[11] 4,220,437
[45] Sep. 2, 1980

[54] TRAILER MOUNTED APPARATUS FOR HAULING RAILROAD WHEELS

[75] Inventor: Nick R. DeWitt, Portola Valley, Calif.

[73] Assignee: Railcar Maintenance Company, San Francisco, Calif.

[21] Appl. No.: 917,604

[22] Filed: Jun. 21, 1978

[51] Int. Cl.³ .............................................. B60P 1/00
[52] U.S. Cl. .................................... 414/549; 414/546
[58] Field of Search .............. 414/572, 584, 391, 546, 414/549, 426, 427, 428, 430; 105/367; 29/803; 206/335; 104/1 R; 295/34; 193/38–41

[56] References Cited

U.S. PATENT DOCUMENTS

| 339 | 7/1837 | Town | 295/34 X |
|---|---|---|---|
| 2,788,179 | 4/1957 | Hafer et al. | 105/367 X |
| 3,902,612 | 9/1975 | Hall | 414/546 X |

FOREIGN PATENT DOCUMENTS 121302 3/1948 Sweden ................................... 414/546

Primary Examiner—Stephen G. Kunin
Assistant Examiner—Lawrence E. Williams
Attorney, Agent, or Firm—Townsend and Townsend

[57] ABSTRACT

A transport frame and lifting apparatus for the transport of railroad wheel sets is disclosed. The transport frame is configured for mounting to a hauling flatbed, preferably a flat truck trailer bed hauled by a fifth wheel attached tractor. The frame includes an axle support surface, preferable paired beams, spaced at less than the inside wheel to wheel distance to receive and roll the wheel sets at the medial axles. The axle support surface is a distance above the flatbed so that the wheel sets when received at the axles have the wheel peripheral rail flanges clear the flatbed. Movement of the wheels to a storage position on the transport frame occurs by rolling the wheels on the medial axles to a storage position where peripheral tie-downs secure the wheels at their rims from movement. Upon arrival at a loading and/or unloading destination, a reciprocating lever arm assembly at one end of the transport frame effects loading and unloading of the wheel sets. The lever arm is reciprocated out and over the end of the hauling flatbed on rollers supported on one end of the transport bed.

13 Claims, 5 Drawing Figures

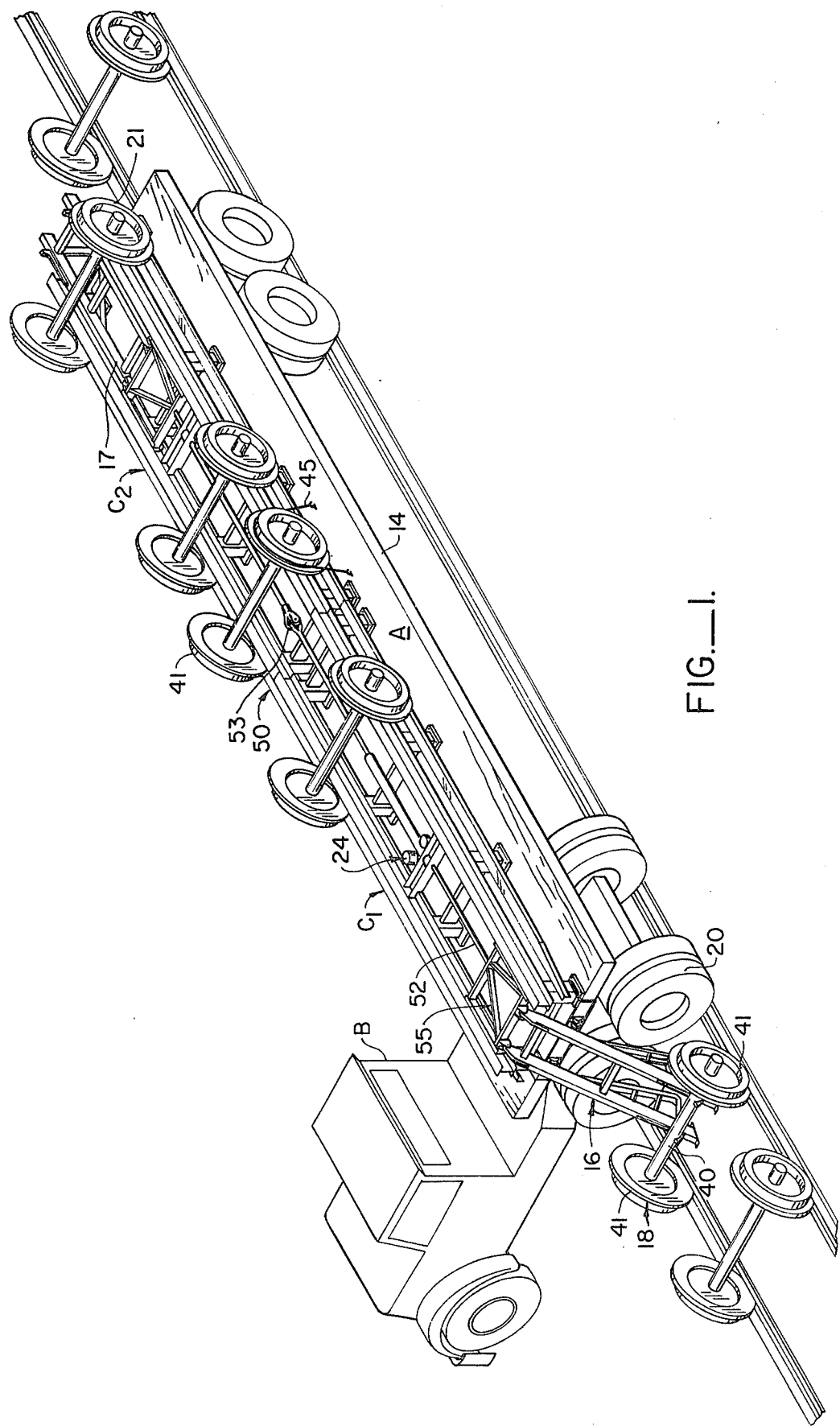
FIG._1.

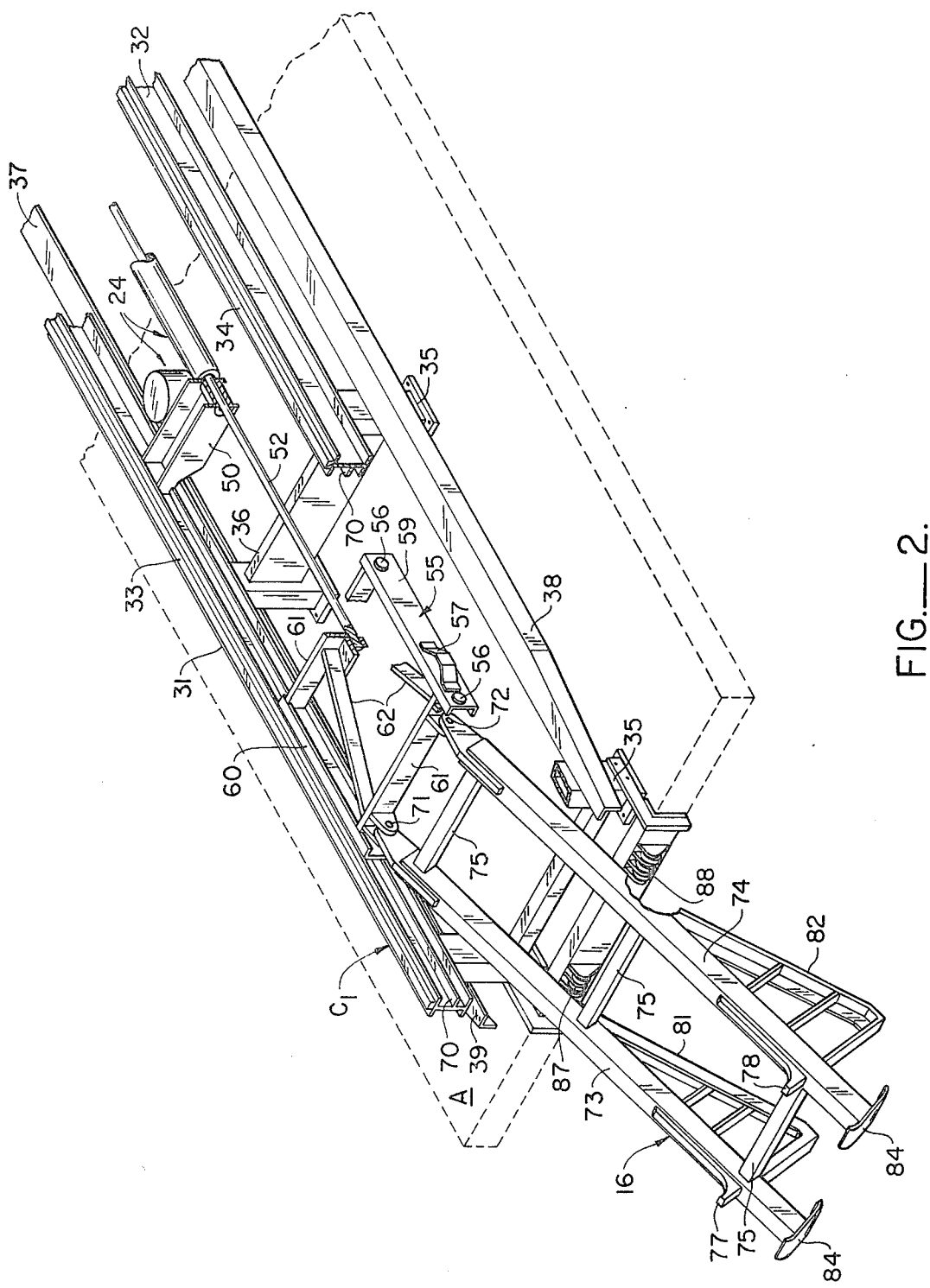
FIG._2.

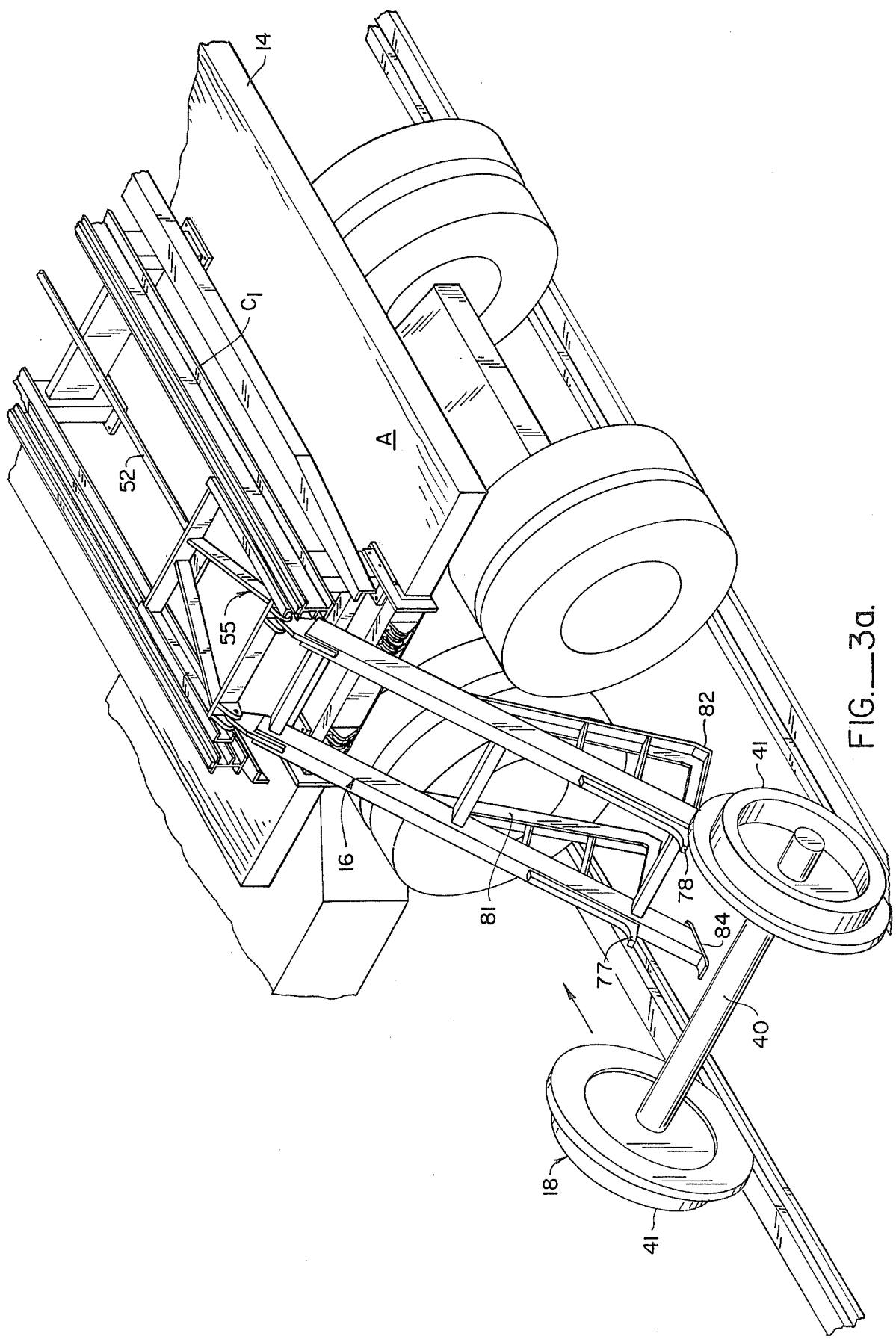
FIG._3a.

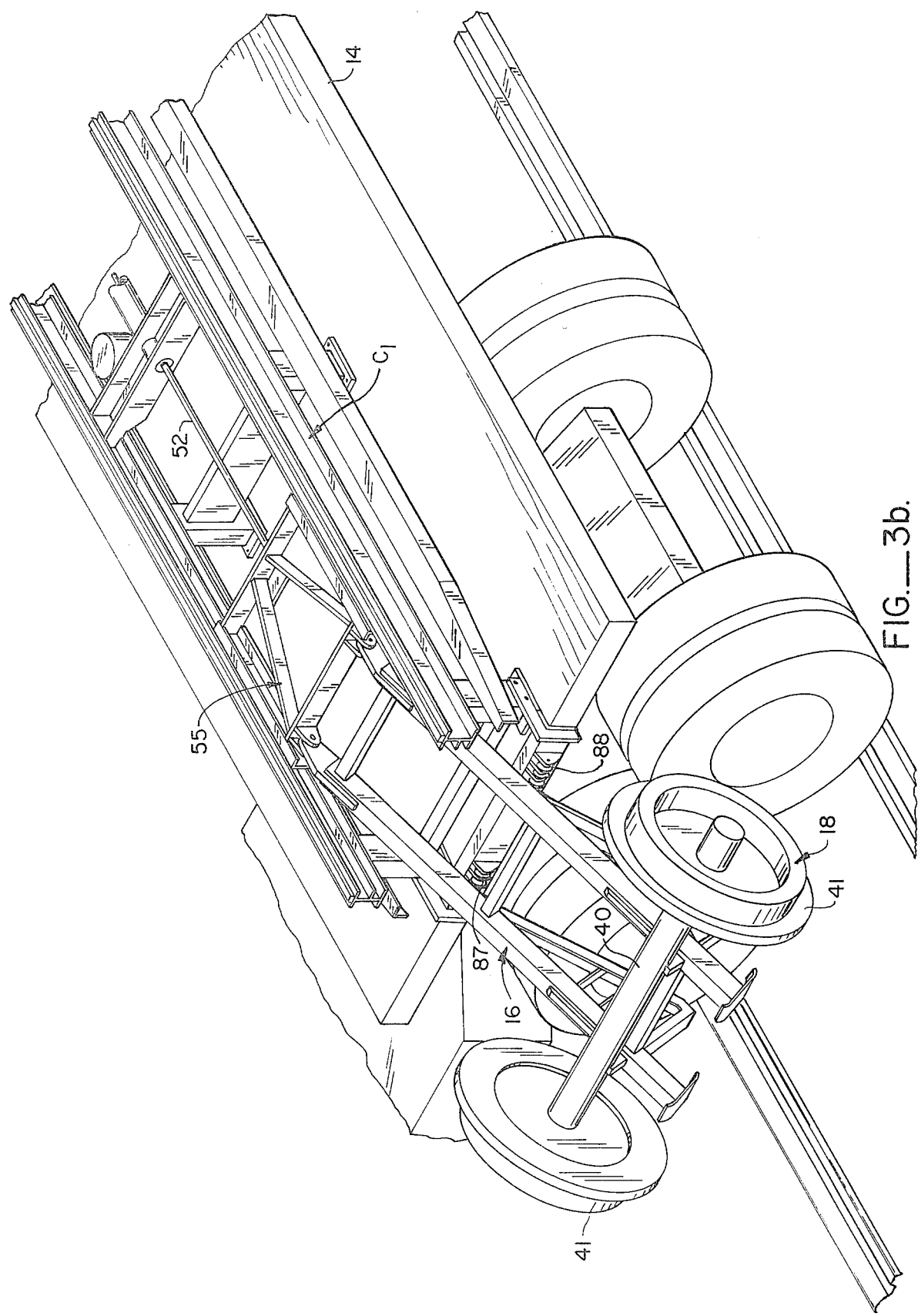
FIG._3b.

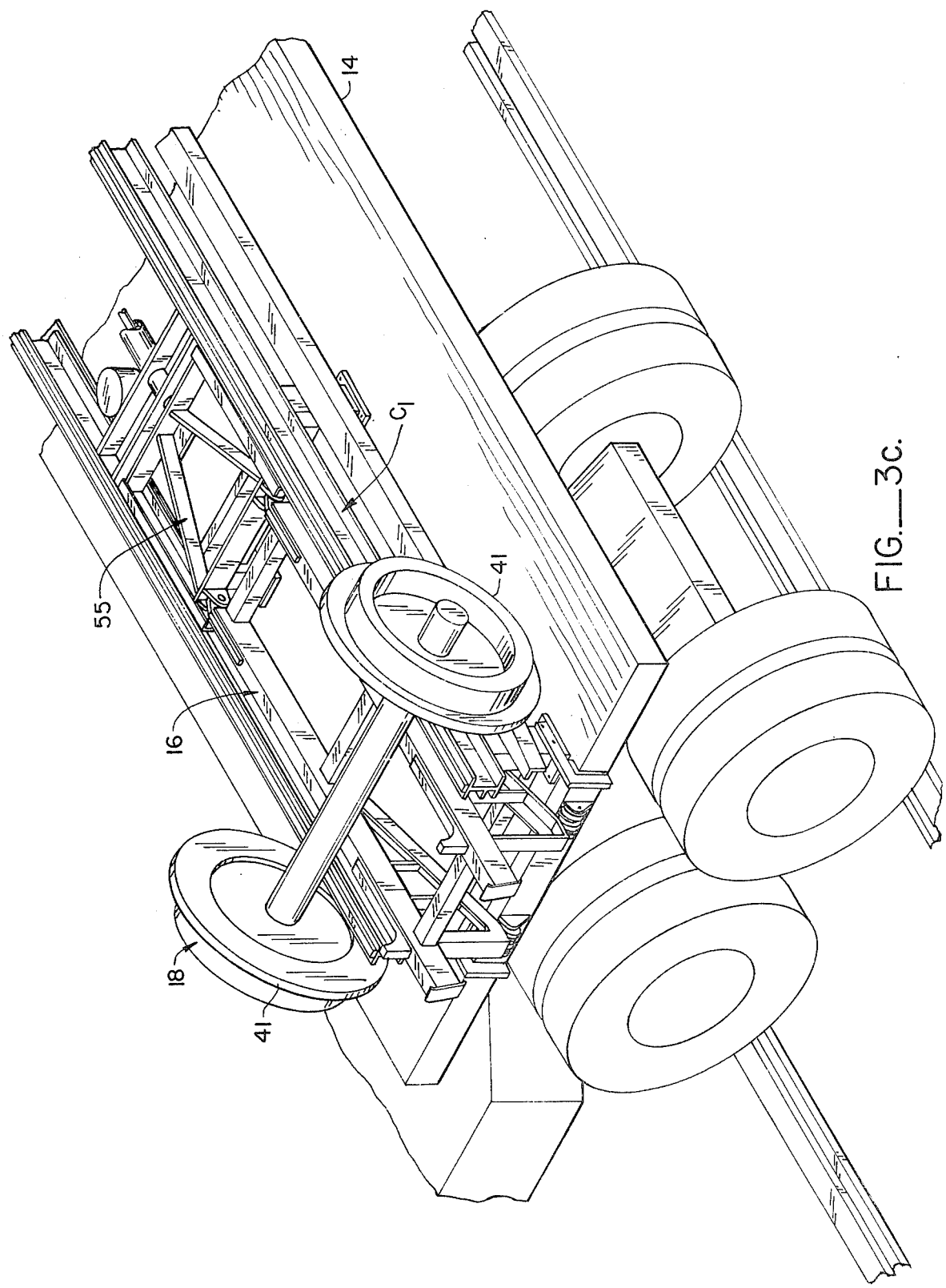
FIG._3c.

TRAILER MOUNTED APPARATUS FOR HAULING RAILROAD WHEELS

This invention relates to a flatbed attachment for the hauling of railroad wheel sets.

STATEMENT OF THE PROBLEM

Modern railroading includes the use of so called "unit trains" for the hauling of bulk loaded product, such as coal, ore and the like. Typically, such unit trains make continuous round trips between loading facilities and unloading facilities with very little idle time. The result is that wear due to constant train movement occurs. Railroad car wheel sets receive much wear.

To service such unit train facilities there have been developed modern car repair facilities. Such car repair facilities cycle a percentage of the total cars used through a repair facility. Disassembly of the trucks and removal of wheel sets for repairs occur.

Wheel set repair facilities are specialized. Typically, the wheels themselves and their rims and flanges are repaired with modern equipment in a specialized and centralized location. A wheel set repair facility usually handles wheels sets from many car repair facilities. As a result there has grown a need to transport wheel sets from remote car repair facilities to a centralized and specialized wheel set repair facility. The disclosed invention relates to a specialized flatbed hauling apparatus directed to this need.

SUMMARY OF THE PRIOR ART

Specialized rigs for hauling reels of cable are known. Such rigs include paired beams on which axle mounted reels of cable are transported, which beams typically have at one end arms for loading and unloading the reels. These devices, however, are generally unsuitable for the transport of railroad wheel sets. Major reasons why they are unsuitable for the transport of railroad wheel sets include their inability to load and unload from either end of a flatbed as well as an inability to properly secure transported wheel sets against the dynamics experienced while the wheel sets are being transported. Accordingly, the present invention directs itself to the specialized problems created by the transport of railroad wheels sets.

SUMMARY OF THE INVENTION

A transport frame and lifting apparatus for the transport of railroad wheel sets is disclosed. The transport frame is configured for mounting to a hauling flat bed, preferably a flat truck trailer bed hauled by a fifth wheel attached tractor. The frame includes an axle support surface, preferably paired beams spaced at less than the inside wheel to wheel distance to receive and roll the wheel sets at the medial axles. The axle support surface is a distance above the flatbed so that the wheel sets when received at the axles have the wheel peripheral rail flanges clear the flatbed. Movement of the wheels to a storage position on the transport frame occurs by rolling the wheels on the medial axles to a storage position where peripheral tie-downs secure the wheels at their rims from movement. Upon arrival at a loading and/or unloading destination, a reciprocating lever arm assembly at one end of the transport bed effects loading and unloading of the wheel sets. In the raised position, the lever arm is disposed coplanar to the axle support surface and a wheel set is rolled onto and received by cradle members at the end of the lever arm. Once the wheel set is so positioned, the lever arm is then reciprocated out and over the end of the hauling flatbed on rollers supported on one end of the transport bed. When the lever arm loaded with a wheel set is moved to the extended position, the lever arm pivots and lowers the wheel set to define an extended path capable of clearing a flatbed hauling tractor at the driving wheels when the tractor is parked at right angles to a trailer or the coupler of a hauling flatbed railroad car. As the wheels are grasped at the intermediate axle, upon lowering of the lever arm, the rims and flanges of the wheel sets are free to be placed on guaged rail. Preferably, two transporting beds are given longitudinal dimensions, so that when they are placed end to end, they occupy the full length of a hauling flatbed. In this position reciprocating lever arms are placed at either end of the transport frames extending over the flatbed end, so that the paired units can load the transport frame at one end and unload the transport frame at the opposite end. By the expedient of providing concentric and reciprocating mechanisms having interconnection between two end to end placed units, one motorized transporting frame can actuate two lever arms, so that loading at one end and unloading at the opposite end can occur either individually or in tandem operation.

OTHER OBJECTS AND ADVANTAGES

An object of this invention is to disclose an improved transport frame for railroad wheel sets. Accordingly, a transport frame is configured for placement on a hauling flatbed. This transport frame includes at least one axle support surface, preferably paired beams for receiving at spaced apart intervals the axle of railroad wheel sets. These paired beams are spaced apart at an interval which is less than the distance between the wheels. The beams are each given an elevation above the hauling flatbed, so that the wheel sets at their rims clear the bottom of the hauling flatbed and permit rolling movement of the wheel sets at their axle along the length of the beams. Paired guide rails having a side to side dimension only slightly less than the inside wheel to inside wheel dimension of the wheel set are disposed at an elevation just below the wheel set axles. This combination of beams and guiderails permits peripheral tie-downs to be placed over the outer rim of the wheels, so that during movement the wheels are rigidly secured to the transport bed.

An advantage of the guide rails is that they supply aligning torques to the wheel sets at the inside wheel surfaces. This torque is applied in front of and behind the wheel set axle to the wheels. Alignment of the wheel set to the axle support surface occurs.

An advantage of this aspect of the invention is that the disclosed transport frames can be placed on virtually any platform, stationary or moving. For example, the transport frame can either be placed on a railroad car or preferably the flatbed of a truck. Such a placement is removeable, so that any flatbed can readily be converted to and from the specialized function of hauling railroad wheel sets.

A further advantage of this invention is that the paired beams and guide rails enable peripheral tie-downs at the wheels at their rims. This gives high leverage in securing the wheels against movement caused by the dynamic forces encountered in transport.

A further object of this invention is to disclose in combination with the transport frame a loading mechanism. According to this aspect of the invention a loading and unloading mechanism, consisting of a reciprocating arm pivotally attached to the hauling flatbed at one end and depending outward and down from the hauling flatbed at the other end is disclosed. When the lever arm is in a parallel disposition to the transport frame, a wheel set can be rolled on and received at cradles on the lever arm. Thereafter, the lever arm reciprocates out and rolls over transport frame supported rollers to depend outwardly and pivot downwardly from the transport bed along an arcuate path during such outward reciprocation. When the lever arm is fully extended, the wheel set is held in opposition at the axle by the cradles and may be landed at its destination. Preferably, such landing occurs at the exposed rims and flanges of the railroad wheels on trackage at a car repair facility or a wheel set repair facility.

An advantage of the loading mechanism is that the arcuate path of the lever arm is capable of clearing a fifth wheel and driving tractor wheel set when the tractor is parked at right angles to a flatbed trailer. With this clearance, loading at the hauling end of a flatbed truck is possible.

Yet another advantage of this apparatus is that when the wheel set transporter is mounted to a railroad car, clearing of the couplers of the car by the lever arm is also possible.

Yet another advantage of this invention is that by placing paired units end to end on a flatbed loading can occur from one end of the flatbed with unloading occurring at the opposite end, even though towing apparatus, such as a tractor is connected to the flatbed.

Yet another object of this invention if to prevent angular cocking with resultant jamming of the wheel sets during loading and unloading. According to this aspect of the invention, a guide rail is mounted immediately below and outside of the respective paired rails of the transport bed. The guide rail is placed at a level, so that it is near and adjacent to the axle of the wheel set. By tapering the guide rails in gathering relation to the inside wheel dimension of a railroad wheel set, a self-aligning feature is imparted to inside points of each wheel of the wheel sets during loading and unloading. Angular jamming of loaded wheel sets on the transport frame is prevented.

A further object of this invention is to provide only one power unit for actuating two levers on the respective remote ends of at least one transport frame. According to this embodiment of the invention, two transport frames can be placed end to end. Each of the transport frames includes at its end remote from the other transport frame a lever arm. Each of the lever arms is actuated by concentric reciprocating units. By the expedient of placing one power unit on one transport frame, selective connection of either or both concentric reciprocating units can be made. With this concentric connection, respective selective operation of either or both lever arms can be made.

An advantage of this aspect is the simultaneous loading of a wheel set can occur to one transport frame while unloading occurs to the other transport frame.

An additional advantage of this aspect of the invention is that the lever arms may be selectively uncoupled from the single driving unit, either one lever arm, or the other lever arm may be individually activated.

Other objects, features and advantages of this invention will become more apparent after referring to the following specification and attached drawings in which:

FIG. 1 shows a flatbed trailer with fifth wheel mounted driving tractor parked at a right angle and attached to the flatbed having the transport frames of this invention supported on the flatbed, illustrating two end to end transport frames effecting loading of wheel sets to one end of the trailer with the unloading of wheel sets to the opposite end of the trailer;

FIG. 2 is an enlarged perspective view of the transport frame and lever arm broken away to illustrate the construction; and, FIGS. 3A–3C are a cartoon series illustrating the loading of a wheel set to the transport frame of this invention.

Referring to FIG. 1, a hauling flatbed A, here shown in the preferred form of a truck trailer is shown having a tractor B parked at right angles to flatbed A. First and second transport frames C1 and C2 are resting on and fastened to hauling flatbed A. Transport frame C1 is shown with a lever arm 16 in the extended position about to pick up and load a railroad wheel set 18. It will be observed that lever arm 16 clears the tractor B in the vicinity of its fifth wheel (hidden from view) and its driving wheels 20.

Transport frame C2 is shown with its lever arm in the raised position. It will be observed that the lever arm extends slightly beyond the end of transport frame C2 and has a wheel set 21 loaded thereon. This wheel set is ready for unloading. As will hereinafter become apparent, provision is made for a single power unit 24 of the ball-screw variety to actuate both lever arm 16 attached to transport frame C1 and lever arm 17 attached to transport frame C2.

Having generally described the invention shown in the perspective of FIG. 1, construction will be set forth with respect to FIG. 2. First the configuration of the transport frame and the securing of the individual wheel sets for transport will be set forth. Secondly, the construction and actuation of the lever arm will be described. Finally, and with reference to the cartoon series of FIGS. 3A–3C, typical operation for loading of a wheel set will be described. The reverse function of unloading of the wheel set can be easily understood, and will not be specifically set forth.

Referring to FIG. 2, the construction of transport frame C1 is shown. Transport frame C1 includes paired I-beam members 31, 32, having respective bar stock members 33, 34, placed along the upper flange thereof. These respective beams are mounted to supporting columns 35 and crossbraced at braces 36 to hold the respective beams 31, 32, in spaced apart relation. Columns 35 are removably fastened to flatbed A as by bolts.

Beams 31, 32, are spaced apart a distance less than the inside wheel to inside wheel dimension of a rail road wheel set. These respective beams, 31, 32, at their respective bar stock members, 33, 34, have an elevation above the flatbed A. This elevation is sufficient so that the intermediate axle 37 of a railroad wheel set lies above the surface of the flatbed A a sufficient distance so that the flanges of railroad wheels clears the surface of flatbed A.

Paired guide rails 37, 38, are mounted to the outside of the respective beams 31, 32. These guide rails have at their portion adjacent to the outward end of the transport frame respective gathering surfaces 39, 40. These gathering surfaces permit wheel sets when loaded to rub along the inside of the respective wheels at points ahead of or behind the wheel set axle. When rubbing occurs at one or the other at the gathering portions 39, 40, centering of the wheel set to the lever arm 16 occurs when the lever arm is in the raised position as shown in FIG. 3C. These gathering surfaces effect centering of the wheel set to the transport frame C1 when the wheel set is rolled on its axle from the lever arm 16 on to the respective beams 31, 32.

Guide rails 37, 38, are placed so that they are a relatively small distance below the axle 40 of the wheel set. In this position their contact with the inner surface of the respective wheels 41, of each wheel set is at a plane only slightly below the axle 40. It has been found that in this disposition, a maximum centering torque is applied to each wheel set.

Assuming that the respective transport frames C1, C2, are fully loaded, fastening of the wheel sets to the respective transport frame C1, C2, can be easily understood. Specifically, a flexible tensil member 45, is placed over each of the wheels 41, at their rims. This member is then fastened at both ends under tension to flatbed A. As fastened to flatbed A, the respective wheel sets are rigidly held. Should the hauling flatbed A be brought to a rapid stop during transport, the flexible members 45 in combination with the support of the wheel sets on both the beams 31, 32, and guide rails 37, 38, prevents any movement of the wheel sets.

It will be noted that flatbed A is occupied by two respective frames C1, C2. These frames are abutted end to end at 50 so that the two frames together form a continuous and longitudinal transport frame on flatbed A. As will be apparent to those having skill in the art, respective transport frames C1, C2, can be any given length. Moreover, where for example this invention is placed on a flatbed railroad car, intervening frame segments can be placed to have the combined transport frames accommodate flatbeds of greatly varying lengths.

Having set forth the transport frame C1, attention will now be directed to construction of lever arm 16, reference being had to FIG. 2.

A ball screw 24, a standard item of manufacture, is mounted to transport frame C1 at cross member 50. A central and reciprocating rod 52, is actuated by ball screw 24 to reciprocate towards and away from the ball screw. Preferably, ball screw 24 is actuated by an electric motor. It will be realized, of course, that hydraulic and pneumatic actuation may occurs as well.

Shaft 52 from ball screw 54 extends to and is attached to a car 55. Car 55 includes rollers 56 and spacers 57 placed on the outside of paired U-shaped car sides 59, 60. These respective sides 59, 60 are in turn cross-braced by suitable bracing 61, and diagonal bracing 62.

Car 55 rides on opposed U-shaped rails defined from the respective beams 31, 32. Typically, the inside web of each of the beams 31, 32, has a rail member 70 fastened thereto. Rollers 56 ride on and support car 55 on rail member 70 defining with beam 31, 32 opposed U-shape rails. Spacers 57 align car 55 for rolling movement as it is actuated by shaft 52 from ball screw 24. It is realized that rollers 56 and spacer 57 attached to U-shaped car side 60 are hidden from view. As they are identical in construction to those shown attached to U-shaped car side 59, further explanation is not given.

Lever arm 16 attaches to car 55 at respective clevices 71, 72. The lever arm includes two box beam members 73, 74, cross-braced at suitable intervals by cross bracings 75. Beams 73, 74 have cradle members 77, 78, fastened thereto.

These cradle members 77, 78, received the wheel sets at their respective axles 40 so that the wheel sets rest outwardly and against the raised surface at the extremity of the cradle members. Each box beam 73, 74, has fastened at the bottom thereof a downwardly depending angle member 81, 82. These respective angle members extend from the medial portion of the lever arm 16, angularly and away from the respective box beam 73, 74, to a maximum distance from the box beams directly under cradle members 77, 78.

Each box beam at the end remote from car 55 includes a landing pad 84. As shown in the view of FIG. 3A, pads 84 in combination with depending angle members 81, 82, form a four point landing for the outer extremity of the lever arms 16 when the lever arm 16 is actuated to a fully extended position through respective reciprocating motion of car 55 and shaft 52.

In addition to forming a landing surface, angle members 81, 82 have a second function. Specifically, these members at their bottom surface pass over rollers 87, 88 supported on flatbed A. Typically, the rollers are of conventional design and integrally fastened to frame C1.

In operation, lever arm 16 rides over rollers 87, 88, at its respective box beams 73, 74, and its downwardly depending angle members 81, 82. It is the combination of these lower surfaces of the lever arm 16 which imparts to the lever arm an arcuate path as the lever arm reciprocally moves to and from a plannar position to the transport frame C1. This movement enables the lever arm to define an arcuate path which clears obstacles supporting or under the hauling flatbed, such as the driving wheels of an attached tractor or the couplers of a flatbed railroad car.

Having completed the description of the invention, the operation of the loader mechanism can now be set forth with respect to the cartoon series of FIGS. 3A-3C. In these figures, the loading of a wheel set to the transport frame C1 will be illustrated. As unloading is sequentially the opposite of loading, the function of unloading will not be specifically described.

In loading, rod 52 extends fully forward to move car 55 to the end of flatbed A. Lever arm 16 extends fully outward and lands on its respective landing gear 84, and the angled members 81, 82. In this disposition, cradle members 77, 78 are below the axle 40 of a railroad wheel set.

As shown in FIG. 3A, wheel set 18, being loaded is rolled on rail. It should be understood that cradle member 77, 78, are at a distance from landing pad 84, so that loading of the wheel set on and off of a flat surface is possible.

Once lever arm 16 is fully extended, wheel set 18 is rolled to and disposed so that its axle 40 is under the respective cradle member 77, 78. When this occurs, shaft 52, car 55, and the clevice attached lever arm 16 moves inwardly and toward the center of transport frame C1 (see FIG. 3B). When such movement occurs, the undersurface of lever arm 16 contacts rollers 87, 88 and picks wheel set 18 at axle 40 from the ground (see FIG. 3B). When this movement is complete as shown in FIG. 3C, wheel set 18 is elevated to an elevation coincident to the top portion of transport frame C1. In this raised disposition, the wheel set may be rolled from cradle members 77, 78 on its axle forwardly of frame C1 to a position where it can be fastened for transport.

Returning to the view of FIG. 1, it will be observed that only one ball screw 24 is shown. Ball screw 24 has first and second shafts 52, 53 extending therefrom. These respective shafts can be removably attached from the respective lever arms 16, 17, by removable attachment to the respective cars 55 attached to each of these arms. Moreover, the overall length of shafts 52, 53, is such that ball screw 24 may reciprocate lever arm 16 to a loading position shown in FIG. 1, while lever arm 17 at the opposite end of flatbed A is in the raised position. By the expedient of attaching both shafts 52, 53, to their respective cars 55, loading of a wheel set at one end of flatbed A with unloading at the opposite end of flatbed A can occur in tandum.

It will be appreciated that this invention will admit a modification. For example, more transport frames may be used on flatbeds of greater length. Additionally, the transport frames can be built integrally to the chasis of a trailer and not mounted for removable attachment to it. Other modifications may be made all without parting from the spirit of this invention.

What is claimed is:

1. A transport frame for hauling railroad car wheel sets on a flatbed having a planar surface, said railroad car wheel sets including paired wheels of given diameter interconnected by an axle shaft, said transport frame comprising: at least one axle support surface disposed longitudinally along the length of said transport frame, said axle support surface having a width less than the inside wheel distance of said wheels of said railroad wheel set; said axle support surface having a vertical heighth sufficient to permit said railroad car wheel set to roll on the interconnecting axle thereof on said support surface while the outer periphery of said wheel set is above the planar surface of said flatbed upon which said transport frame rests; and guide rail means spaced outwardly of said axle support surface for contacting the interior periphery of said railroad wheels immediately below and forward and behind of the axle of said wheel sets, so that upon rolling movement of said wheel set on said axle, canting movement of said wheel set is resisted.

2. The transport frame of claim 1 and including an arm mounted to said support frame, said arm configured for pivotal movement from a first disposition parallel to said support surface to a second disposition wherein said arm depends angularly downward from said transport frame to rest at a lower elevation; and, at least one cradle mounted to said arm for receiving the intermediate axle of a railroad car wheel set when said wheel set is rolled from said transport frame onto said arm when said arm is in said first parallel disposition to said support frame, said cradle being disposed on said arm to receive in opposition said axle of said wheel set to lower said wheel set with said arm, whereby said wheel set can be rolled at the wheels thereof from said arm.

3. The invention of claim 2 and wherein said arm reciprocates into and out of said transport frame.

4. The invention of claim 3 and wherein said guide rail adjacent said reciprocating arm includes gathering means spaced outwardly of said beam for contacting the interior periphery of said railroad wheels immediately below and forward and behind of the axle of said wheel sets, so that upon movement of said wheel set to said support frame, canting movement of said wheel set is resisted as said wheel set moves from said arm to said support surface.

5. A support frame and lifting apparatus for moving railroad car wheel sets having spaced apart wheels with an interconnecting axle, said wheel sets being movable between a first elevation below said support frame to a second and higher elevation on said support frame, said support frame and lifting apparatus comprising: a support frame defining at least one axle support surface disposed longitudinally along the length of said support frame, said support surface having a width less than the inside wheel to wheel distance of railroad car wheels of a railroad wheel set; said support surface being disposed substantially level and having a vertical height sufficient to permit said railroad car wheel sets to roll over said axle support surface on the interconnecting axle thereof while the outer periphery of each wheel of said wheel sets is above any adjacent foundation on which said support frame rests; an arm mounted to an end of said support frame, said arm configured for pivotal movement between a first disposition wherein said arm depends angularly downward from said second and higher elevation to said first elevation to a second disposition parallel to said support surface; and, at least one cradle mounted to said arm for receiving the intermediate axle of a railroad car wheel set when a wheel set is rolled on said arm when said arm is in said second parallel disposition to said support frame, said cradle being disposed on said arm to receive in opposition said axle of said wheel set to lower said wheel set with said arm to said first disposition whereby said wheel set can be rolled on the wheels thereof from said arm to said first elevation.

6. The invention of claim 5 and wherein said arm reciprocates into and out of said support frame during movement between said first disposition to said second disposition.

7. The invention of claim 6 and wherein said support frame includes at least one roller; and said arm is configured for rolling movement over the surface of said roller during reciprocating movement between said first disposition and said second disposition.

8. The invention of claim 5 and including means for the removable attachment of said support frame and lifting apparatus to a flatbed.

9. In combination a support frame for mounting to a flatbed; a flatbed having at least one end with towing means extending outwardly and from under said flatbed at one end thereof; lifting apparatus for moving railroad car wheel sets having spaced apart wheels with an interconnecting axle, said wheel sets being movable between a first elevation below said support frame to a second and higher elevation on said support frame, said support frame defining at least one axle support surface disposed longitudinally along and above the length of said flatbed, said axle support surface having a width less than the inside wheel to wheel distance of said railroad car wheels of a railroad wheel set; said axle support surface being disposed substantially level and having a vertical heighth over the flatbed on which said support surface rests sufficient to permit said railroad car wheel sets to roll over said axle support surface on the interconnecting axle thereof while the outer periphery of each wheel of said wheel sets is above said flatbed; lifting apparatus including an arm mounted to an end of said support frame, said arm configured for pivotal movement between a first disposition wherein said arm depends angularly downward from said elevation of said support surface to the ground over said towing means to a second disposition parallel to said support surface; and, at least one cradle mounted to said arm for receiving the intermediate axle of a railroad car wheel set when a wheel set is rolled to said arm in said second disposition parallel to said support surface, said cradle being disposed on said arm to receive in opposition said axle of said wheel set to lower said wheel set with said arm between said second disposition to said first disposition whereby said wheel set can be rolled on the wheels thereof from said arm in said first disposition to said first elevation.

10. The combination of claim 9 and wherein said flatbed comprises a flatbed trailer and said towing means includes a tractor parked at right angles to said flatbed trailer with the driving wheels of said tractor extending outwardly and from under said flatbed at one end thereof.

11. The combination of claim 9 and wherein said arm reciprocates into and out of said support frame during movement between said first disposition and said second disposition.

12. The combination of claim 9 and including first and second support frames each including an arm; said support frames placed end to end over said flatbed and having one arm extending over said flatbed at a first end thereof and said other arm depending over said flatbed at the opposite end thereof.

13. The combination of claim 12 and including means for moving said arm in reciprocating motion attached to one of said frames; and means interconnecting said power means of one frame to the arm of said other frame for causing said single power means to actuate both said arms.

* * * * *